US009290409B2

(12) United States Patent
Binhussain et al.

(10) Patent No.: US 9,290,409 B2
(45) Date of Patent: Mar. 22, 2016

(54) GLAZE COMPOSITION, METHOD FOR MANUFACTURING THE GLAZE COMPOSITION AND METHODS OF GLAZING

(71) Applicants: King Abdul Aziz City for Science and Technology, Riyadh (SA); Università di Padova, Padua (IT)

(72) Inventors: Mohammed A Binhussain, Riyadh (SA); Paolo Colombo, Padua (IT); Enrico Bernardo, Padua (IT); Majed A Binmajed, Riyadh (SA); Mauro Marangoni, Padua (IT); Hamad H Atalasi, Riyadh (SA); Amer M Alajmi, Riyadh (SA); Abdulaziz Altamimi, Riyadh (SA)

(73) Assignee: King Abdulazia City for Science and Technology (KACST), Riyadh (SA)

( * ) Notice: Subject to any disclaimer, the term of this patent is extended or adjusted under 35 U.S.C. 154(b) by 331 days.

(21) Appl. No.: 13/726,161

(22) Filed: Dec. 23, 2012

(65) Prior Publication Data

US 2014/0174126 A1 Jun. 26, 2014

(51) Int. Cl.
| | |
|---|---|
| C04B 33/32 | (2006.01) |
| C03C 8/08 | (2006.01) |
| C03C 8/02 | (2006.01) |
| C03C 1/00 | (2006.01) |
| C03C 3/078 | (2006.01) |
| C03C 17/04 | (2006.01) |

(52) U.S. Cl.
CPC . *C03C 8/08* (2013.01); *C03C 1/002* (2013.01); *C03C 3/078* (2013.01); *C03C 8/02* (2013.01); *C03C 17/04* (2013.01)

(58) Field of Classification Search
CPC .......... C03B 19/06; C03B 19/09; C03C 8/08; C03C 8/02; C03C 1/002; C03C 3/078; C03C 17/04; C03C 19/01; C03C 19/06; C03C 19/066; C03C 19/09; C04B 33/13; C04B 33/1352
USPC ...................... 264/241, 250, 255, 256; 428/49
See application file for complete search history.

(56) References Cited

U.S. PATENT DOCUMENTS 2,576,565 A * 11/1951 Brown ................... C04B 32/00
                                                264/DIG. 49
3,963,506 A *  6/1976 Shutt .................... C04B 33/132
                                                501/131
4,110,487 A *  8/1978 Rion ........................ C03C 8/00
                                                427/193

(Continued)

OTHER PUBLICATIONS

Karamanova E., Karamanov A., "Glass-ceramic frits from fly ash in terracotta production", Waste Manag Res. Feb. 2009;27(1):87-92.*

*Primary Examiner* — Jason L Lazorcik
(74) *Attorney, Agent, or Firm* — Timberline Patent Law Group PLLC (57) ABSTRACT

The invention provides a glass ceramic glaze composition manufactured using conventional raw material and one or more waste materials, wherein the waste materials are capable of producing glass forming oxides and glass modifying oxides. The waste materials are selected from a group that includes cullet, pozzolanic waste and fly ash. The invention also provides a method for manufacturing the glass ceramic glaze composition. Further, the invention provides different methods of glazing a glass ceramic substrate using the glass ceramic glaze composition.

5 Claims, 7 Drawing Sheets

(56) References Cited

U.S. PATENT DOCUMENTS

| | | | | |
|---|---|---|---|---|
| 4,261,938 A | * | 4/1981 | Engstrom | C03C 17/04 264/122 |
| 4,758,538 A | * | 7/1988 | Satoh | C04B 38/02 501/2 |
| 4,833,015 A | * | 5/1989 | Furuuchi | C03B 19/08 428/309.9 |
| 5,008,053 A | * | 4/1991 | Hashimoto | B32B 18/00 264/642 |
| 5,069,960 A | * | 12/1991 | Fukumoto | C03C 11/007 428/310.5 |
| 5,091,345 A | * | 2/1992 | Becker | C03C 8/02 501/14 |
| 5,190,708 A | * | 3/1993 | Vitaliano | B28B 11/044 264/601 |
| 5,358,760 A | * | 10/1994 | Furlong | B28B 5/04 428/2 |
| 5,366,548 A | * | 11/1994 | Riddle | C04B 28/021 106/697 |
| 5,374,307 A | * | 12/1994 | Riddle | C04B 28/021 106/697 |
| 5,447,891 A | * | 9/1995 | Spinosa | C03C 8/02 501/16 |
| 5,484,480 A | * | 1/1996 | Styron | C04B 14/10 106/692 |
| 5,536,345 A | * | 7/1996 | Lingart | B44C 5/0407 156/89.24 |
| 5,558,690 A | * | 9/1996 | Hnat | C03B 3/02 423/111 |
| 5,583,079 A | * | 12/1996 | Golitz | C03C 1/002 106/624 |
| 5,649,987 A | * | 7/1997 | Greulich | C03B 19/09 501/155 |
| 5,665,290 A | * | 9/1997 | Koslowski | C04B 33/13 264/669 |
| 5,720,835 A | * | 2/1998 | Lingart | C03B 19/06 264/112 |
| 5,792,524 A | * | 8/1998 | Lingart | C03B 19/06 428/319.1 |
| 5,814,572 A | * | 9/1998 | Saiki | C03C 1/00 106/DIG. 4 |
| 5,830,251 A | * | 11/1998 | Simpson | C03B 5/005 501/155 |
| 5,895,511 A | * | 4/1999 | Tikhonova | C03B 19/06 65/144 |
| 5,900,202 A | * | 5/1999 | Lingart | B28B 11/24 264/113 |
| 5,935,885 A | * | 8/1999 | Hnat | C03B 3/02 106/DIG. 1 |
| 6,068,803 A | * | 5/2000 | Weyand | C04B 28/18 106/705 |
| 6,187,255 B1 | * | 2/2001 | Greulich | C03B 19/06 264/122 |
| 6,284,176 B1 | * | 9/2001 | Oujiri | B32B 17/00 264/112 |
| 6,340,650 B1 | * | 1/2002 | Haun | C03B 19/06 501/155 |
| 8,465,814 B2 | * | 6/2013 | Wang | C03C 11/007 428/304.4 |
| 8,936,850 B2 | * | 1/2015 | Wang | 264/43 |
| 2002/0031656 A1 | * | 3/2002 | Kotama | B01D 53/02 428/304.4 |
| 2002/0132722 A1 | * | 9/2002 | Raichel | C03C 1/002 501/155 |
| 2004/0144132 A1 | * | 7/2004 | Reznik | B44C 3/04 65/17.3 |
| 2005/0031844 A1 | * | 2/2005 | Wang | C03C 11/00 428/304.4 |
| 2005/0276951 A1 | * | 12/2005 | Iwase | B28B 11/044 428/172 |
| 2008/0076655 A1 | * | 3/2008 | Eamsiri | C03B 19/06 501/32 |
| 2012/0031306 A1 | * | 2/2012 | Belden | B28B 5/025 106/705 |
| 2014/0174126 A1 | * | 6/2014 | Binhussain | C03C 1/002 65/21.5 |
| 2014/0179509 A1 | * | 6/2014 | Binhussain | C03C 1/002 501/32 |
| 2014/0191448 A1 | * | 7/2014 | Binhussain | C04B 41/80 264/660 |
| 2014/0243182 A1 | * | 8/2014 | Binhussain | C03C 10/0036 501/32 |

* cited by examiner

GLAZE COMPOSITION, METHOD FOR MANUFACTURING THE GLAZE COMPOSITION AND METHODS OF GLAZING

FIELD OF THE INVENTION

The invention generally relates to a glass ceramic glaze composition, a method for manufacturing the glass-ceramic glaze composition and different methods of glazing using the glass ceramic glaze composition. More specifically, the invention relates to a glass ceramic glaze composition and glazed glass ceramics manufactured using natural raw materials, industrial waste raw materials and waste-derived glass.

BACKGROUND OF THE INVENTION

Glazes are widely used for coating ceramics in various industries. Glazes are generally used to color, decorate, strengthen and waterproof the ceramics. The glazes also exhibit properties of excellent scratch resistance and glossiness.

Generally, the glazes are prepared using raw materials such as, but not limited to, silica, zircon, kaolin, feldspar, dolomite, magnesium carbonate, boric acid and potassium nitrate in an industrial grade. A selected set of raw materials are thoroughly mixed and melted in a furnace with a very high temperature to prepare molten raw materials. The molten raw materials are poured into water to obtain glass frits. The glass frits are ground in a mill, which are then used as glazes. These glazes are applied on ceramic bodies and fired at high temperature to obtain glazed ceramic bodies. The temperature used for firing and melting the raw materials are very high and consumes high amount of energy. Further, the glazes produced using conventional methods exhibit only few desired mechanical and chemical properties.

Additionally, industrial wastes such as pozzolanic wastes, fly ash, limestone mining tailings, etc are immobilized by disposal in land-fills or immobilized in cement industries. Handling and disposal of such industrial waste may require additional cost and is also hazardous to the environment.

Therefore, there is a need to develop a method for manufacturing glass ceramic glazes which is environment friendly, cost effective and has superior mechanical and chemical properties.

BRIEF DESCRIPTION OF THE FIGURE

The accompanying figure together with the detailed description below forms part of the specification and serves to further illustrate various embodiments and to explain various principles and advantages all in accordance with the present invention.

DETAILED DESCRIPTION OF THE INVENTION

Before describing in detail embodiments that are in accordance with the invention, it should be observed that the embodiments reside primarily for a glass ceramic glaze composition, in method steps related to manufacturing the glass ceramic glaze composition and in method steps related to glazing glass ceramics using the glass ceramic composition.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Generally speaking, pursuant to various embodiments, the invention provides a glass ceramic glaze composition, a method for manufacturing the glass ceramic glaze composition and different methods of glazing glass ceramic substrates using the glass ceramic glaze composition. The glass ceramic glaze composition is manufactured using conventional raw material such as silica, sand, clay and limestone with one or more waste materials. The waste materials, which are capable of producing glass forming oxides and glass modifying oxides, are chosen. The waste materials are selected from a group that includes cullet, pozzolanic waste and fly ash.

Figure 1:
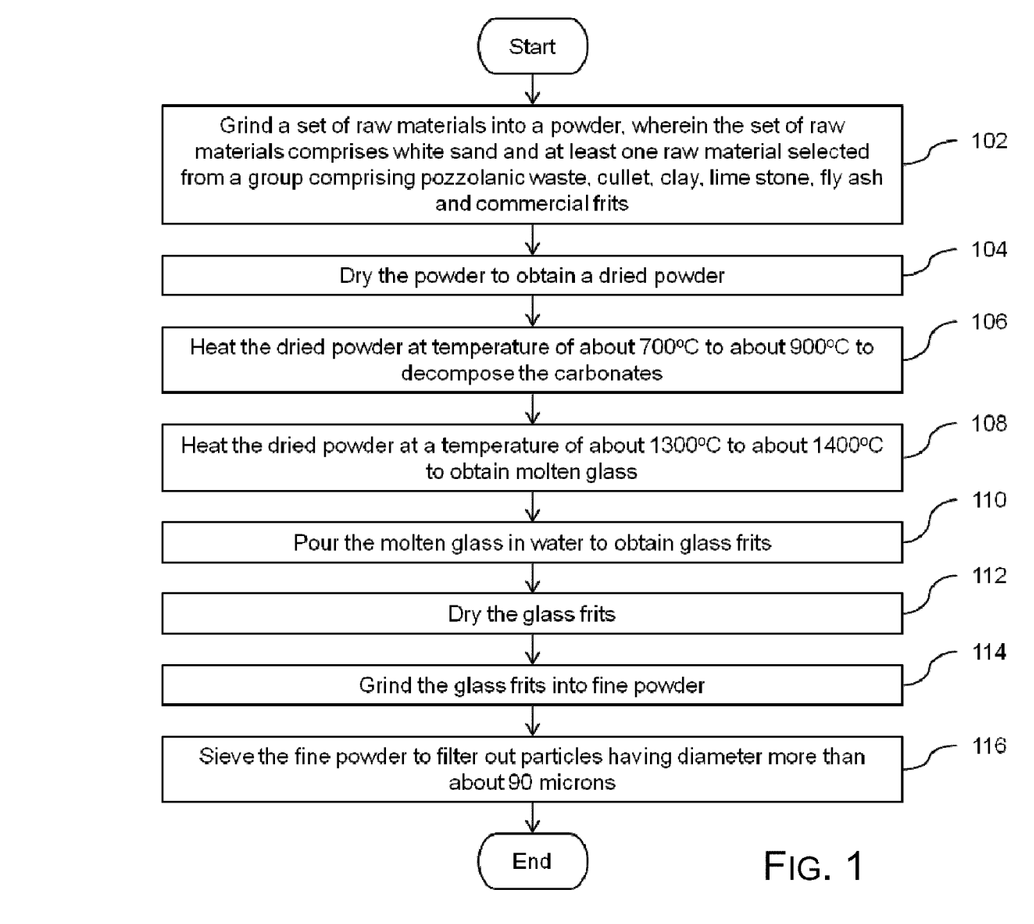
FIG. 1 illustrates a flow diagram of a method for manufacturing a glass ceramic glaze composition in accordance with an embodiment of the invention.

FIG. 1 illustrates a flow diagram of a method for manufacturing a glass ceramic glaze composition in accordance with an embodiment of the invention.

A specific set of raw materials are used to manufacture the glass ceramic glaze composition. The raw materials are selected based on a desired composition of the glass ceramic glaze. Preferably, the set of raw materials for manufacturing the glass ceramic glaze composition are selected such that the set of raw materials are similar to raw materials used to prepare a glass ceramic substrate on the surface of which the glaze is applied. The set of raw materials includes conventional raw material used to manufacture glass ceramic glazes and one or more waste materials. The waste materials, which are capable of producing glass forming oxides and glass modifying oxides, are chosen. The glass forming oxides may include, but not limited to, silicon dioxide ($SiO_2$), boron trioxide ($B_2O_3$) and phosphorus pentoxide ($P_2O_5$). The glass modifying oxides may include, but not limited to, sodium oxide ($Na_2O$), potassium oxide ($K_2O$), calcium oxide (CaO) and magnesium oxide (MgO). Other oxides such as, but not limited to, aluminum oxide ($Al_2O_3$), titanium dioxide ($TiO_2$), zirconium dioxide ($ZrO_2$), ferric oxide ($Fe_2O_3$), and manganese dioxide ($MnO_2$) can also be produced in various degrees in final formulation of the glass ceramic glazes.

In the set of raw materials, the conventional raw materials may include white sand, clay, limestone and commercial fits and the waste materials are selected from a group that includes cullet, pozzolanic waste and fly ash. The waste materials are selected in such a way that the selected waste materials provide high amount of crystallize phases in the final formulation of the glass ceramic glaze composition. Using 10-15% of recycled glass as raw materials for manufacturing the glaze composition leads to low temperatures requirement when the raw materials are melted. Cullet, glass waste from recycling plants, is very beneficial as use of cullet decreases time and temperature required during the manufacturing process of the glass ceramic glazes.

Further, a composition of commercial fits includes 40 weight percent (wt %) to 70 wt % of silicon dioxide ($SiO_2$), 4 wt % to 18 wt % of zirconium dioxide ($ZrO_2$), 20 wt % to 25 wt % fluxing elements as major components, 7 wt % to 9 wt % of stabilizing elements as minor components and Zirconium(IV) silicate ($ZrSiO_4$). The fluxing elements in the composition of commercial fits includes oxides such as, but are not limited to, sodium oxide ($Na_2O$), potassium oxide ($K_2O$), Lead(II) oxide (PbO) and boron trioxide ($B_2O_3$). The stabilizing elements in the composition of commercial fits includes oxides such as, but are not limited to, ZnO, aluminum oxide ($Al_2O_3$), calcium oxide (CaO), barium oxide (BaO) and magnesium oxide (MgO). Preferably, the weight ratio of $SiO_2/Al_2O_3$ is up to 10 in the composition of commercial fits. $ZrSiO_4$ proves to enhance opacity, especially in the presence of ZnO if weight ratio of $SiO_2/Al_2O_3$ is up to 10.

Further, color of the glass ceramic glaze composition is controlled by changing percentage of iron oxide and oxidation states of the iron oxides. The set of raw materials are selected based on requirement of the color of the glass ceramic glaze. For instance, depending on the percentage of iron oxide and oxidation states of the iron oxides, firing turns the glass ceramic glazes into colors such as, but not limited to, green, red, brown or black colors. For production of white colored glass ceramic glaze composition, the raw materials includes glass frit which contain low amount of iron oxide and whitening agents such as, but not limited to, $ZrSiO_4$, $Al_2O_3$, $TiO_2$, $CaF_2$. A choice of proportions of whitening agents in the set of raw materials for both production of white colors and whitened colors depends on required match for different coefficients of thermal expansion (CTE) between a glass ceramic glaze and a glass ceramic substrate. Depending on the set of raw materials chosen, resulting glass ceramic glazes possess different refractive indexes, surface textures and promote a wide variety of effects.

At step 102, a set of raw materials are ground into a powder. Any suitable grinding machine such as, but not limited to, a roll crusher, a ball mill or an impeller breaker can be used for grinding the set of raw materials and as such those techniques would be apparent to those ordinarily skilled in the art.

In an embodiment, the set of raw materials includes about 10 weight percent (wt %) to about 40 wt % of white sand, about 5 wt % to about 40 wt % of clay, about 5 wt % to about 20 wt % of limestone, about 10 wt % to about 30 wt % of cullet, about 10 wt % to about 35 wt % of fly ash and about 10 wt % to about 30 wt % of pozzolanic waste.

In another embodiment, the set of raw materials includes about 10 wt % to about 30 wt % of white sand, about 10 wt % to about 30 wt % of clay, about 10 wt % to about 40 wt % of cullet, about 10 wt % to about 30 wt % of fly ash and about 30 wt % to about 85 wt % commercial fits.

In yet another embodiment, the set of raw materials includes about 10 wt % to about 40 wt % of white sand, about 5 wt % to about 40 wt % of clay, about 5 wt % to about 15 wt % of cullet, about 10 wt % to about 30 wt % of pozzolanic waste, and about 15 wt % to about 35 wt % of fly ash.

In yet another embodiment, the set of raw materials includes about 10 wt % to about 40 wt % of white sand, about 10 wt % to about 40 wt % of clay, about 10 wt % to about 30 wt % of cullet, about 5 wt % to about 20 wt % of limestone, and about 10 wt % to about 30 wt % of fly ash.

In yet another embodiment, whitening agents such as, but not limited to, $ZrSiO_4$, $Al_2O_3$, $TiO_2$ and $CaF_2$ are also added to the set of raw materials for both production of white colors and whitened colors in the glass ceramic glaze.

At step 104, the powder is dried to obtain a dried powder. Thereafter, at step 106, the dried powder is placed in a crucible and heated at temperature of about 900° C. to decompose carbonates in the powder. Subsequently, at step 108, the dried powder is heated at a temperature of about 1300° C. to about 1400° C. to obtain molten glass. In an embodiment, the dried powder is heated at a temperature of about 1300° C. to about 1400° C. for a period of about 1 hour to about 4 hours to obtain the molten glass. Preferably, the dried powder is heated in an alumino-silicate refractory crucible in air at step 108.

At step 110, the molten glass is poured in water to obtain glass frits. The glass frits are formed as the molten glass is cooled to a temperature far below a transformation range when poured in water.

At step 112, the glass fits are collected from water and are allowed to dry. In accordance with the embodiment, the glass frits are dried at a temperature of about 80° C. for period of about 8 hours to about 10 hours. For example, the glass frits can be dried at a temperature of about 80° C. in an oven for period of about 8 hours to about 10 hours.

At step 114, the glass fits are ground into a fine powder. Any suitable grinding machine such as, but not limited to, a roll crusher, a ball mill or an impeller breaker can be used for grinding the set of raw materials and as such those techniques would be apparent to those ordinarily skilled in the art.

At step 116, the fine powder is sieved to filter out particles having diameter more than 90 microns (µ). The processing characteristics are optimized due to the use of particles of sizes of less than 90µ. The fine powder is mixed with binders and used to glaze glass ceramics using different glazing methods.

In various embodiments of the invention, the glass ceramic glaze composition includes one or more glass frits and a glass frit essentially includes about 0 wt % to about 20 wt % of alumina ($Al_2O_3$), about 5 wt % to about 15 wt % of calcium oxide (CaO), about 0 wt % to about 10 wt % of ferric oxide ($Fe_2O_3$), about 0 wt % to about 15 wt % of potassium oxide ($K_2O$), about 0 wt % to about 15 wt % of magnesium oxide (MgO), about 3 wt % to about 15 wt % of sodium oxide ($Na_2O$), about 0 wt % to about 2 wt % of phosphorus pentoxide ($P_2O_5$), about 45 wt % to about 75 wt % of silicon dioxide (SiO2), about 0 wt % to about 4 wt % of titanium dioxide ($TiO_2$) and about 0 wt % to about 1 wt % of Chromium(III) Oxide ($Cr_2O_3$).

In an embodiment, raw materials used to prepare the glass ceramic glaze composition includes about 10 wt % to about 40 wt % of white sand, about 5 wt % to about 40 wt % of clay, about 5 wt % to about 20 wt % of limestone, about 10 wt % to about 30 wt % of cullet, about 10 wt % to about 35 wt % of fly ash and about 10 wt % to about 30 wt % of pozzolanic waste.

In another embodiment, raw materials used to prepare the glass ceramic glaze composition includes about 10 wt % to about 30 wt % of white sand, about 10 wt % to about 30 wt % of clay, about 10 wt % to about 40 wt % of cullet, about 10 wt % to about 30 wt % of fly ash and about 30 wt % to about 85 wt % commercial frits.

In yet another embodiment, raw materials used to prepare the glass ceramic glaze composition includes about 10 wt % to about 40 wt % of white sand, about 5 wt % to about 40 wt % of clay, about 5 wt % to about 15 wt % of cullet, about 10 wt % to about 30 wt % of pozzolanic waste, and about 15 wt % to about 35 wt % of fly ash.

In yet another embodiment, raw materials used to prepare the glass ceramic glaze composition includes about 10 wt % to about 40 wt % of white sand, about 10 wt % to about 40 wt % of clay, about 10 wt % to about 30 wt % of cullet, about 5 wt % to about 20 wt % of limestone, and about 10 wt % to about 30 wt % of fly ash.

Figure 2:
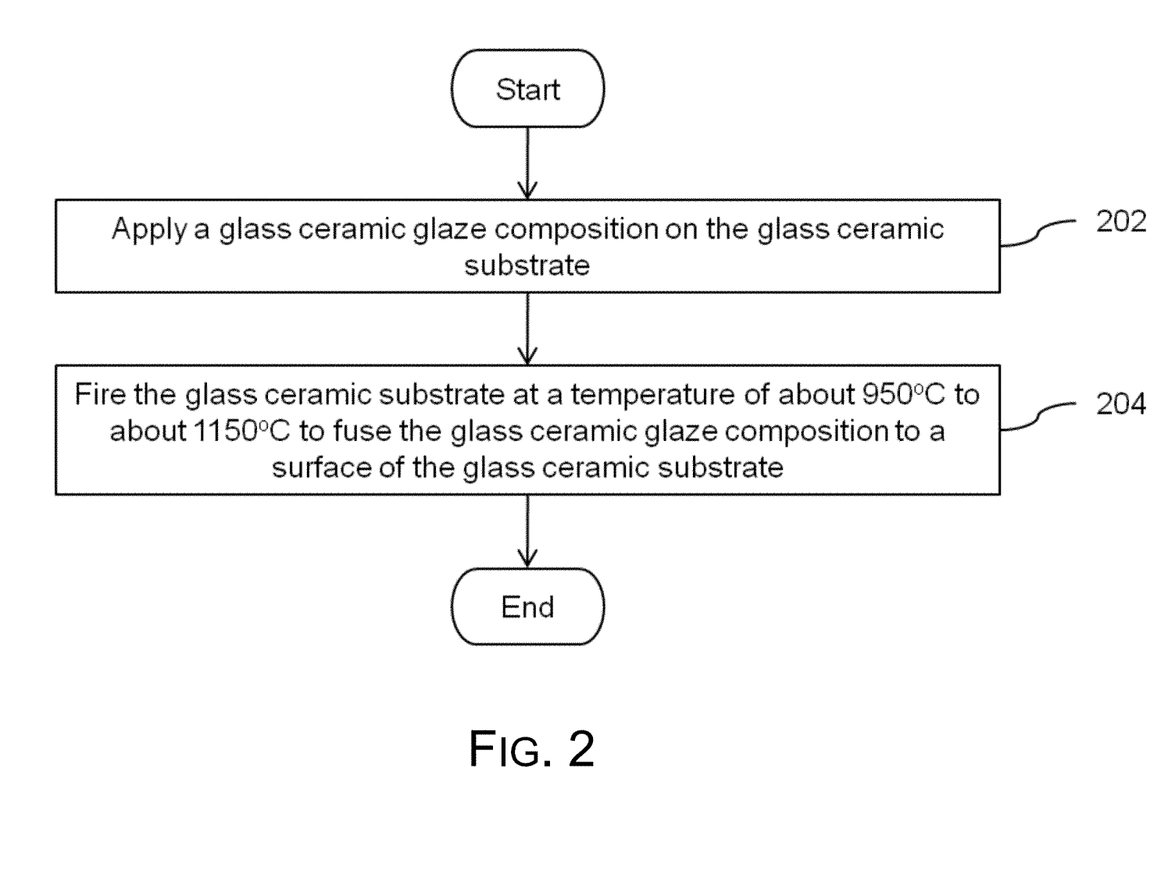
FIG. 2 illustrates a flow diagram of a method for forming a glaze surface on a glass ceramic substrate in accordance with an embodiment of the invention.

FIG. 2 illustrates a flow diagram of a method for forming a glaze surface on a glass ceramic substrate in accordance with an embodiment of the invention.

At step 202, a glass ceramic glaze composition is applied on the glass ceramic substrate. The glass ceramic glaze composition includes one or more glass frits. A glass frit essentially includes about 0 wt % to about 20 wt % of alumina ($Al_2O_3$), about 5 wt % to about 15 wt % of calcium oxide (CaO), about 0 wt % to about 10 wt % of ferric oxide ($Fe_2O_3$), about 0 wt % to about 15 wt % of potassium oxide ($K_2O$), about 0 wt % to about 15 wt % of magnesium oxide (MgO), about 3 wt % to about 15 wt % of sodium oxide ($Na_2O$), about 0 wt % to about 2 wt % of phosphorus pentoxide ($P_2O_5$), about 45 wt % to about 75 wt % of silicon dioxide (SiO2), about 0 wt % to about 4 wt % of titanium dioxide ($TiO_2$) and about 0 wt % to about 1 wt % of Chromium(III) Oxide ($Cr_2O_3$). In accordance with the embodiment, the glass ceramic glaze composition is a fine powder of particle sizes less than 90 microns.

At step 204, the glass ceramic substrate is fired at a temperature of about 950° C. to about 1150° C. to fuse the glass ceramic glaze composition to a surface of the glass ceramic substrate. In accordance with the embodiment, the glass ceramic substrate is fired at a temperature of about 950° C. to about 1150° C. with a rate of about 40° C. per minute to about 120° C. per minute for a period of about 12 minutes to about 1 hour 30 minutes.

Figure 3:
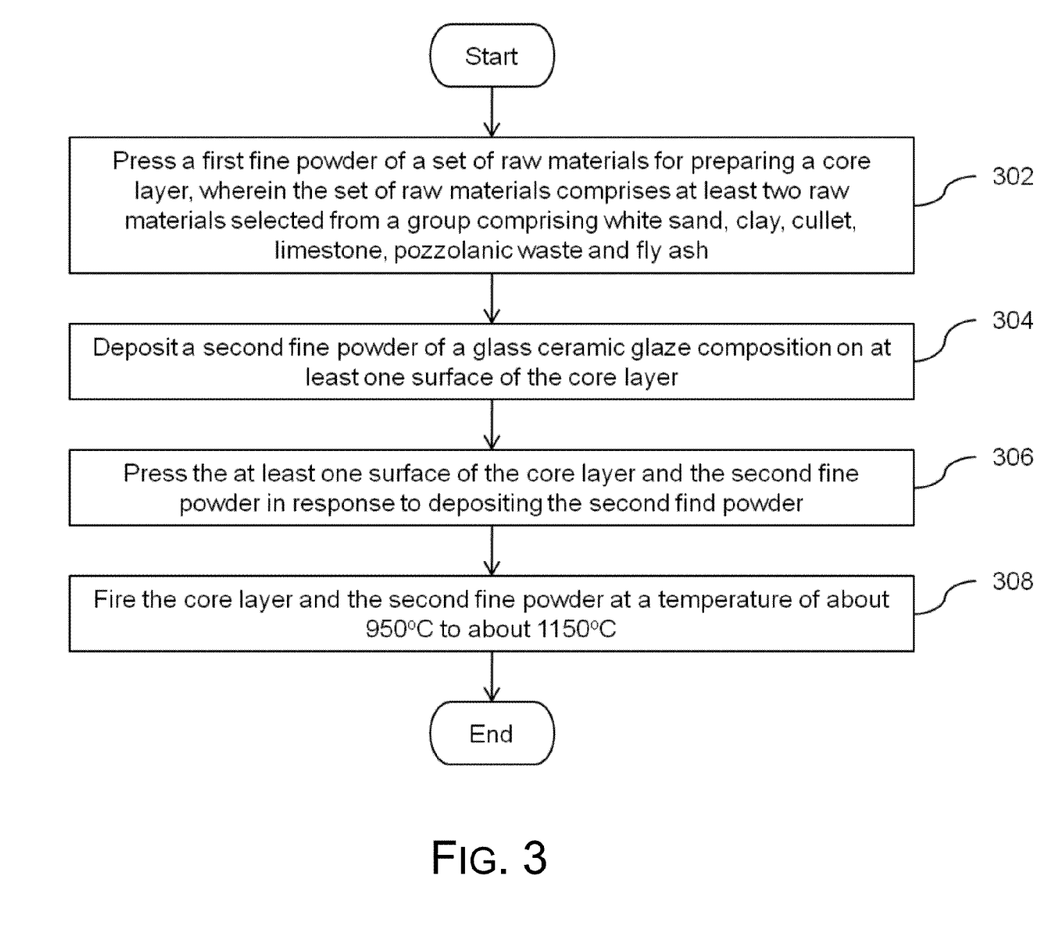
FIG. 3 illustrates a flow diagram of a method for preparing a glazed glass ceramic which is glazed on one side in accordance with an embodiment of the invention.

FIG. 3 illustrates a flow diagram of a method for preparing a glazed glass ceramic which is glazed on one side in accordance with an embodiment of the invention.

A specific set of raw materials are used to manufacture the glazed glass ceramic. The raw materials are selected based on a desired composition of a core layer of the glazed glass ceramic. The set of raw materials includes conventional raw material used to manufacture glass ceramics and one or more waste materials. The waste materials which are capable of producing glass forming oxides and glass modifying oxides are chosen. If the core layer to be formed in the glazed glass ceramic needs to be a porous then the wastes materials which are capable of producing glass forming oxides, glass modifying oxides and pore forming oxides are chosen.

The glass forming oxides may include, but not limited to, silicon dioxide ($SiO_2$), boron trioxide ($B_2O_3$) and phosphorus pentoxide ($P_2O_5$). The glass modifying oxides may include, but not limited to, sodium oxide ($Na_2O$), potassium oxide ($K_2O$), calcium oxide (CaO) and magnesium oxide (MgO). The pore forming oxide may include, but not limited to, ferric oxide ($Fe_2O_3$). Other oxides such as, but not limited to, aluminum oxide ($Al_2O_3$), titanium dioxide ($TiO_2$), zirconium dioxide ($ZrO_2$), ferric oxide ($Fe_2O_3$), and manganese dioxide ($MnO_2$) can also be produced in various degrees in final formulation of the core layer. The conventional raw material includes white sand, clay and limestone. The waste materials are selected from a group that includes cullet, pozzolanic waste and fly ash. The waste materials are selected in such a way that the selected waste materials provide high amount of crystallize phases in the final formulation of the core layer.

If the core layer to be formed in the glazed glass ceramic needs to be a porous then the waste materials are selected in such a way that the selected waste materials provide high amount of crystallize phases in the final formulation of the core layer as well as increases porosity of the core layer. Further, the raw materials for forming the porous core layer are selected such that the pore forming oxides are high in the set of raw material. For example, due to high amount of ferric oxide, the porosity of the porous core layer increases. A change in an oxidation state from $Fe_2O_3$ to FeO ($Fe^{3+}$ to $Fe^{2+}$), which occurs at high temperatures, leads to release of oxygen gas. The oxygen gas is embedded within a glass matrix providing the spontaneous formation of pores. A possibility of successfully producing porous core layer is related to interplay between gas generation and glass viscosity at a given temperature. The glass viscosity needs to be as low as to enable expansion but as high as to avoid gas escape from a molten glass.

At step 302, a first fine powder of a set of raw materials is pressed in a mold for preparing a core layer. In accordance with an embodiment of the invention, the first fine powder of the set of raw materials is pressed using one of uniaxially cold pressing, biaxial cold pressing, dry pressing, semi-dry pressing, compacting, cold isostatic pressing, hot pressing, extrusion molding, injection molding, compression molding, gel casting, slip casting and tape casting. Any other suitable type of technique for pressing can be used at step 302 and as such the techniques which can be used would be apparent to those ordinarily skilled in the art. In an embodiment, the first fine powder is of particle sizes less than 90 microns.

In an embodiment, the set of raw materials includes about 10 wt % to about 40 wt % of white sand, about 5 wt % to about 40 wt % of clay, about 5 wt % to about 20 wt % of limestone, about 5 wt % to about 30 wt % of cullet, about 10 wt % to about 30 wt % of pozzolanic waste, and about 10 wt % to about 35 wt % of fly ash.

In another embodiment, the set of raw materials includes about 10 wt % to about 40 wt % of white sand, about 5 wt % to about 40 wt % of clay, about 5 wt % to about 15 wt % of cullet, about 10 wt % to about 30 wt % of pozzolanic waste, and about 15 wt % to about 35 wt % of fly ash.

In yet another embodiment, the set of raw materials includes about 10 wt % to about 40 wt % of white sand, about 10 wt % to about 40 wt % of clay, about 10 wt % to about 30 wt % of cullet, about 5 wt % to about 20 wt % of limestone, and about 10 wt % to about 30 wt % of fly ash.

In yet another embodiment, the set of raw materials includes about 30 wt % to about 70 wt % of pozzolanic wastes, about 0 wt % to about 20 wt % of white sand, about 0 wt % to about 30 wt % of clay, about 10 wt % to about 100 wt % of cullet and about 0 wt % to about 30 wt % of fly ash.

In yet another embodiment, the set of raw materials includes about 15 wt % to about 70 wt % of pozzolanic waste, about 30 wt % to about 100 wt % of cullet and about 0 wt % to about 15 wt % of clay.

At step 304, the second fine powder of a glass ceramic glaze composition is deposited on a surface of the core layer. The glass ceramic glaze composition includes one or more glass frits. A glass frit essentially includes about 0 wt % to about 20 wt % of alumina ($Al_2O_3$), about 5 wt % to about 15 wt % of calcium oxide (CaO), about 0 wt % to about 10 wt % of ferric oxide ($Fe_2O_3$), about 0 wt % to about 15 wt % of potassium oxide ($K_2O$), about 0 wt % to about 15 wt % of magnesium oxide (MgO), about 3 wt % to about 15 wt % of sodium oxide ($Na_2O$), about 0 wt % to about 2 wt % of phosphorus pentoxide ($P_2O_5$), about 45 wt % to about 75 wt % of silicon dioxide (SiO2), about 0 wt % to about 4 wt % of titanium dioxide ($TiO_2$) and about 0 wt % to about 1 wt % of Chromium(III) Oxide ($Cr_2O_3$). In accordance with the embodiment, the second fine powder is of particle sizes less than 90 microns. In an embodiment, amount of the second fine powder deposited on the core layer is between 88.2 milligram per square centimeter ($mg/cm^2$) and 176 $mg/cm^2$.

At step 306, the core layer and second fine powder are pressed together after depositing the second fine powder on the surface of the core layer. In accordance with the embodiment, the core layer and second fine powder are pressed together using one of uniaxially cold pressing, biaxial cold pressing, dry pressing, semi-dry pressing, compacting, cold isostatic pressing, hot pressing, extrusion molding, injection molding, compression molding, gel casting, slip casting and tape casting. Any other suitable type of technique for pressing can be used at step 306 and as such the techniques which can be used would be apparent to those ordinarily skilled in the art. For example, the core layer and second fine powder are uniaxially cold pressed at a pressure of about 20 Megapascal (MPa) to about 40 MPa in a mold.

Figure 4:
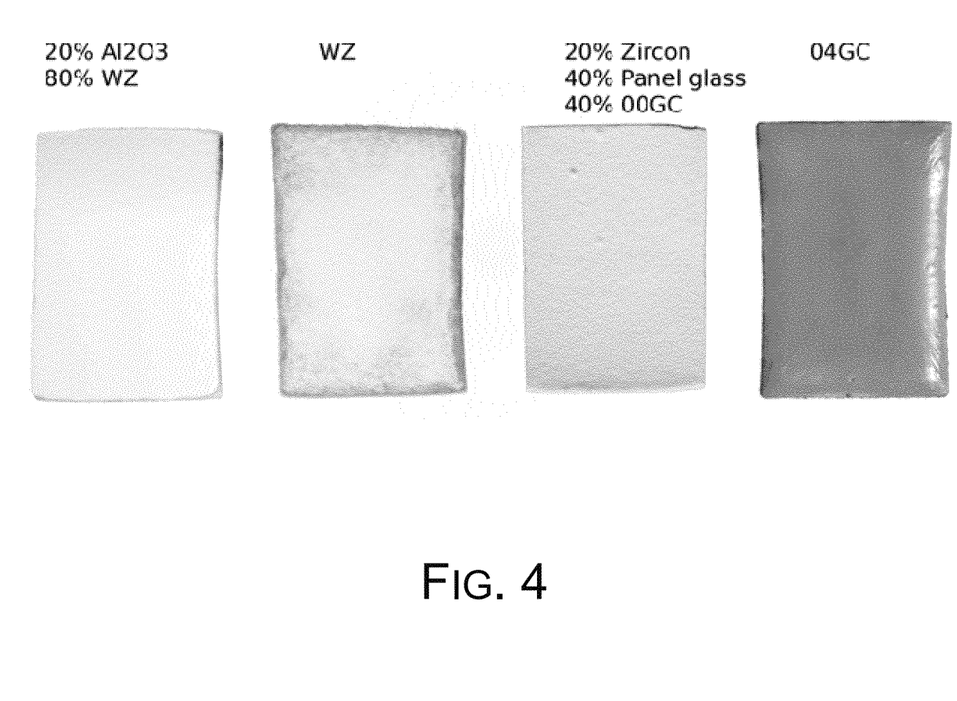
FIG. 4 illustrates a top view of four samples of glass ceramic tiles covered with different glazes.

At step 308, the core layer and the second fine powder are fired together at a temperature of about 950° C. to about 1150° C. In accordance with the embodiment, the core layer and the second fine powder are fired together at a temperature of about 950° C. to about 1150° C. with a rate of about 40° C. per minute to about 120° C. per minute for a period of about 12 minutes to about 1 hour 30 minutes. In an embodiment, after a porous core layer is formed during the formation of glazed glass ceramic, the temperature of firing is decreased with a rate of about 120° C. per minute to about 40° C. per minute until the temperature reaches 800° C. to retain porosity of the porous core layer. After the temperature of the porous core layer is decreased till 800° C., the temperature is then gradually decreased to room temperature. FIG. 4 illustrates a top view of four samples of glass ceramic tiles covered with different glazes in accordance with an exemplary embodiment of the invention.

In accordance with another embodiment of the invention, both sides of a glass ceramic may also be glazed. Such a method to prepare glazed glass ceramic which is glazed on both sides is explained in conjunction with FIG. 5

Figure 5:
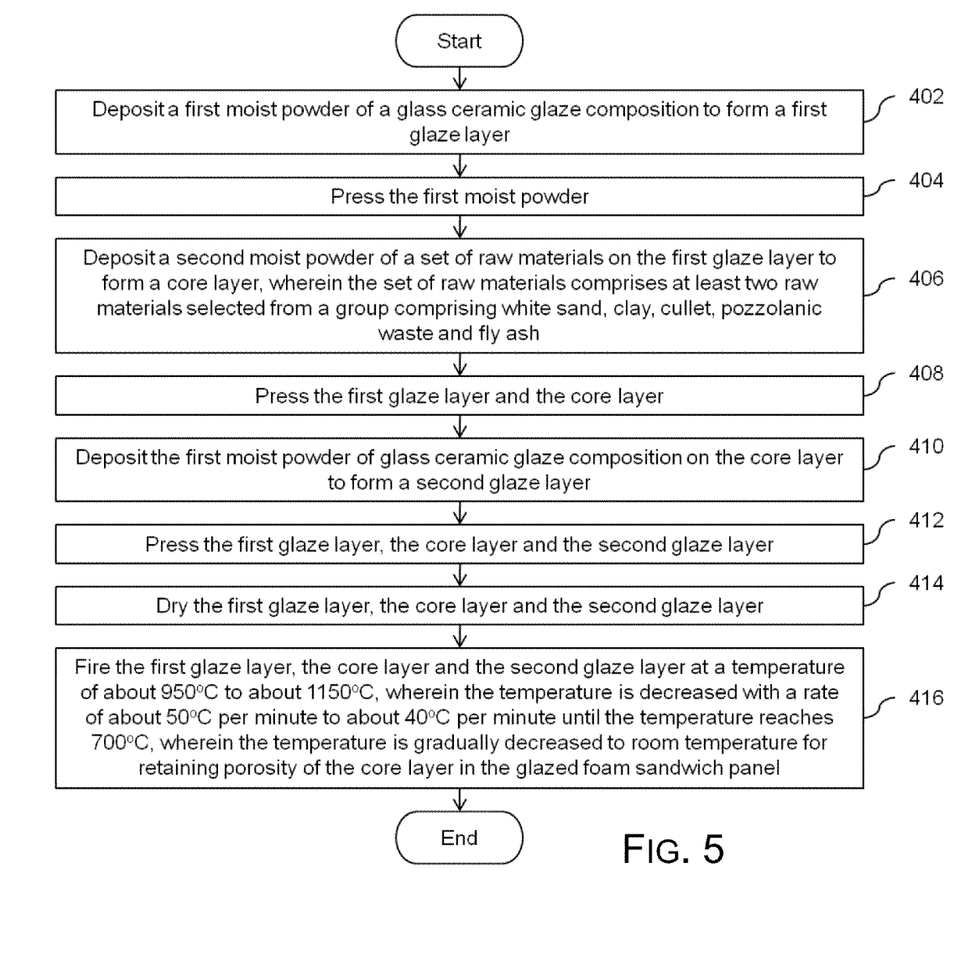
FIG. 5 illustrates a flow diagram of a method for preparing a glazed foam sandwich panel in accordance with an embodiment of the invention.

FIG. 5 illustrates a flow diagram of a method for preparing a glazed foam sandwich panel in accordance with an embodiment of the invention.

A specific set of raw materials are used to manufacture a foamed core layer of the glazed foam sandwich panel. The raw materials are selected based on a desired composition of the foamed core layer. The set of raw materials includes conventional raw material used to manufacture porous glass ceramics and one or more waste materials. The waste materials which are capable of producing glass forming oxides, glass modifying oxides and pore forming oxides are chosen.

The glass forming oxides may include, but not limited to, silicon dioxide ($SiO_2$), boron trioxide ($B_2O_3$) and phosphorus pentoxide ($P_2O_5$). The glass modifying oxides may include, but not limited to, sodium oxide ($Na_2O$), potassium oxide ($K_2O$), calcium oxide (CaO) and magnesium oxide (MgO). The pore forming oxide may include, but not limited to, ferric oxide ($Fe_2O_3$). Other oxides such as, but not limited to, aluminum oxide ($Al_2O_3$), titanium dioxide ($TiO_2$), zirconium dioxide ($ZrO_2$) and manganese dioxide ($MnO_2$) can also be produced in various degrees in final formulation of the foamed core layer. The conventional raw materials include white sand and clay. The waste materials are selected from a group that includes cullet, pozzolanic waste and fly ash. The waste materials are selected in such a way that the selected waste materials provide high amount of crystallize phases in the final formulation of the foamed core layer as well as increases porosity of the foamed core layer.

At step 402, a first moist powder of a glass ceramic glaze composition is deposited to form a first glaze layer. The glass ceramic glaze composition includes one or more glass frits. A glass frit essentially includes about 0 wt % to about 20 wt % of alumina ($Al_2O_3$), about 5 wt % to about 15 wt % of calcium oxide (CaO), about 0 wt % to about 10 wt % of ferric oxide ($Fe_2O_3$), about 0 wt % to about 15 wt % of potassium oxide ($K_2O$), about 0 wt % to about 15 wt % of magnesium oxide (MgO), about 3 wt % to about 15 wt % of sodium oxide ($Na_2O$), about 0 wt % to about 2 wt % of phosphorus pentoxide ($P_2O_5$), about 45 wt % to about 75 wt % of silicon dioxide ($SiO_2$), about 0 wt % to about 4 wt % of titanium dioxide ($TiO_2$) and about 0 wt % to about 1 wt % of Chromium(III) Oxide ($Cr_2O_3$). For example, 10 wt % to 20 wt % of the first moist powder is deposited in a mold and homogenously spread to form the first glaze layer.

At step 404, the first glaze layer is pressed. In accordance with the embodiment, the first glaze layer is pressed using one of uniaxially cold pressing, biaxial cold pressing, dry pressing, semi-dry pressing, compacting, cold isostatic pressing, hot pressing, extrusion molding, injection molding, compression molding, gel casting, slip casting and tape casting. Any other suitable type of technique for pressing can be used at step 306 and as such the techniques which can be used would be apparent to those ordinarily skilled in the art. For example, the first glaze layer is uniaxially cold pressed in order to flatten the layer and remove eventual defects.

At step 406, a second moist powder of a set of raw materials is deposited on the first glaze layer to form a core layer. For example, 60 wt % to 80 wt % of the second moist powder is deposited on the first glaze layer and homogenously spread to form a core layer. In an embodiment, the set of raw materials includes about 30 weight percent (wt %) to about 70 wt % of pozzolanic wastes, about 0 wt % to about 20 wt % of white sand, about 0 wt % to about 30 wt % of clay, about 10 wt % to about 100 wt % of cullet and about 0 wt % to about 30 wt % of fly ash. In another embodiment, the set of raw materials includes about 15 wt % to about 70 wt % of pozzolanic waste, about 30 wt % to about 100 wt % of cullet and about 0 wt % to about 15 wt % of clay.

At step 408, the first glaze layer and the core layer are pressed together. In accordance with the embodiment, the first glaze layer and the core layer are pressed using one of uniaxially cold pressing, biaxial cold pressing, dry pressing, semi-dry pressing, compacting, cold isostatic pressing, hot pressing, extrusion molding, injection molding, compression molding, gel casting, slip casting and tape casting. Any other suitable type of technique for pressing can be used at step 306 and as such the techniques which can be used would be apparent to those ordinarily skilled in the art.

At step 410, the first moist powder of glass ceramic glaze composition is deposited on the core layer to form a second glaze layer. For example, 10 wt % to 20 wt % of the first moist powder is deposited on the core layer and homogenously spread to form the second glaze layer.

At step 412, three layers of the first glaze layer, the core layer and the second glaze layer are pressed together. In accordance with the embodiment, the three layers of the first glaze layer, the core layer and the second glaze layer are pressed together using one of uniaxially cold pressing, biaxial cold pressing, dry pressing, semi-dry pressing, compacting, cold isostatic pressing, hot pressing, extrusion molding, injection molding, compression molding, gel casting, slip casting and tape casting. Any other suitable type of technique for pressing can be used at step 306 and as such the techniques which can be used would be apparent to those ordinarily skilled in the art. For example, the three layers of the first glaze layer, the core layer and the second glaze layer are pressed together are uniaxially cold pressed at a pressure of about 10 Megapascal (MPa) to about 30 MPa in a mold.

At step 414, the three layers of the first glaze layer, the core layer and the second glaze layer are allowed to dry. For example, the three layers of the first glaze layer, the core layer and the second glaze layer are dried in an oven at a temperature of about 80° C. for a period of about 8 hours to about 10 hours.

Figure 6:
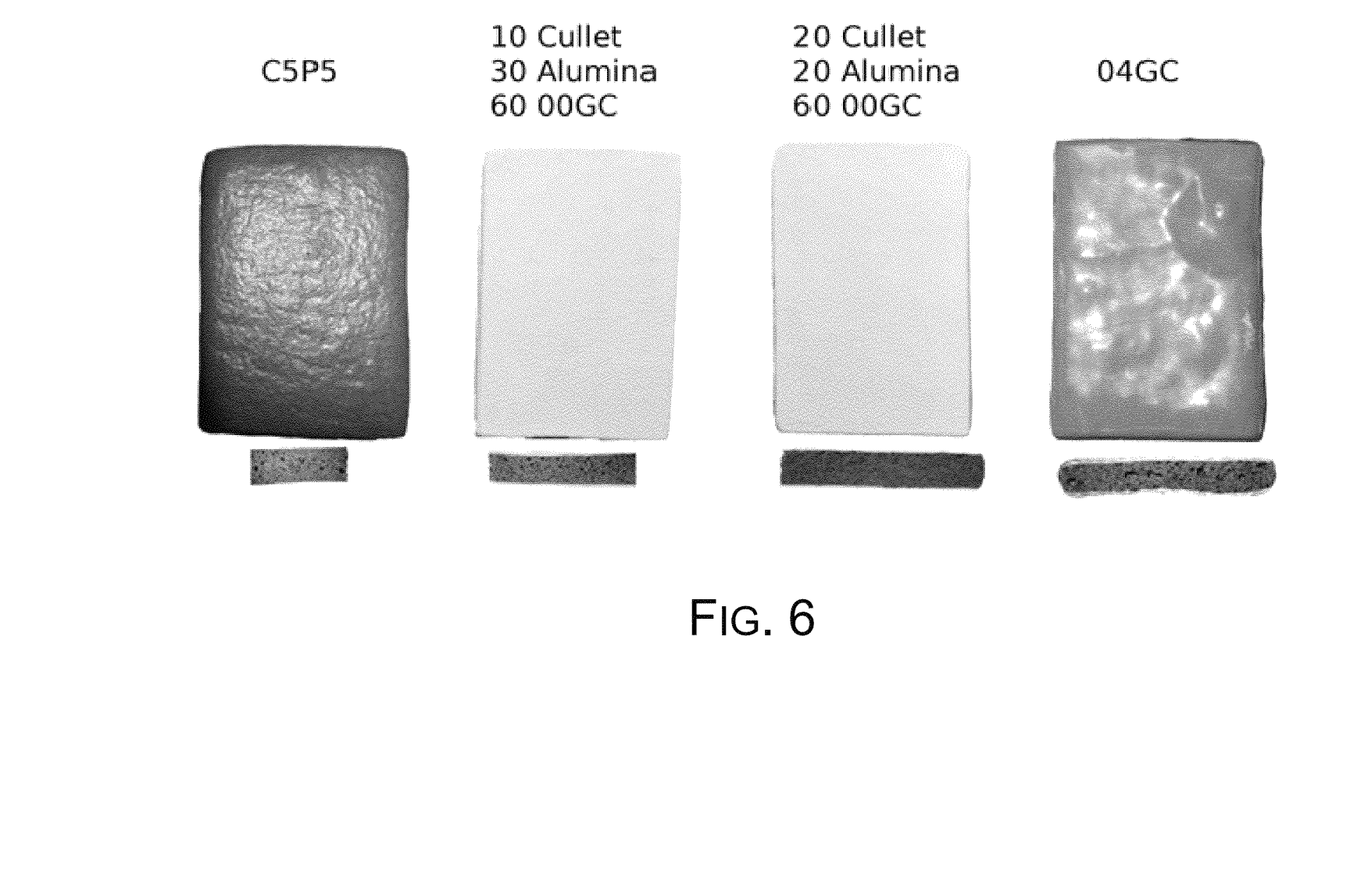
FIG. 6 illustrates a top view and cross sections of four samples of foam sandwich glass ceramic tiles with different glazes.

At step 416, the three layers of the first glaze layer, the core layer and the second glaze layer are fired of about 950° C. to about 1150° C. In accordance with the embodiment, the three layers of the first glaze layer, the core layer and the second glaze layer are fired at a temperature of about 1100° C. with a rate of about 40° C. per minute for a period of about 15 minutes to about 25 minutes. After the foamed core layer is formed, the temperature is decreased with a rate of about 50° C. per minute to about 40° C. per minute until the temperature reaches 700° C. to retain porosity of the foamed core layer. After the temperature of the glazed foam sandwich panel is decreased till 700° C., the temperature is then gradually decreased to room temperature. FIG. 6 illustrates a top view and cross sections of four samples of foam sandwich glass ceramic tiles with different glazes.

Working Example 1

A formulation including 30 grams (g) of white sand, 20 g of pozzolanic waste, 15 g of clay, 25 g of fly ash, and 10 g of cullet is ground in a ball mill to obtain a powder. After grinding, the powder is dried to obtain a dried powder. After drying, the dried powder is placed in an alumino-silicate refractory crucible and heated at temperature of 900° C. Subsequently, the dried powder is heated at a temperature of 1300° C. to 1400° C. for a period of 1 hour to 4 hours to obtain a molten glass. The molten glass is poured in water to obtain glass frits. The glass frits are collected from water and are allowed to dry at a temperature of about 80° C. in an oven for period of about 8 hours to about 10 hours. After drying, the glass frits are ground into a fine powder. After grounding, the fine powder is sieved to filter out particles having diameter more than 90 microns. The fine powder is mixed further with binders and used to glaze glass ceramics using different glazing methods.

Working Example 2

A formulation including 30 g of white sand, 25 g of white sand, 10 g of limestone, 25 g of clay, 25 g of fly ash, and 15 g of cullet is ground in a ball mill to obtain a powder. After grinding, the powder is dried to obtain a dried powder. After drying, the dried powder is placed in an alumino-silicate refractory crucible and heated at temperature of 900° C. Subsequently, the dried powder is heated at a temperature of 1300° C. to 1400° C. for a period of 1 hour to 4 hours to obtain a molten glass. The molten glass is poured in water to obtain glass frits. The glass frits are collected from water and are allowed to dry at a temperature of about 80° C. in an oven for period of about 8 hours to about 10 hours. After drying, the glass frits are ground into a fine powder. After grounding, the fine powder is sieved to filter out particles having diameter more than 90 microns. The fine powder is mixed further with binders and used to glaze glass ceramics using different glazing methods.

Figure 7:
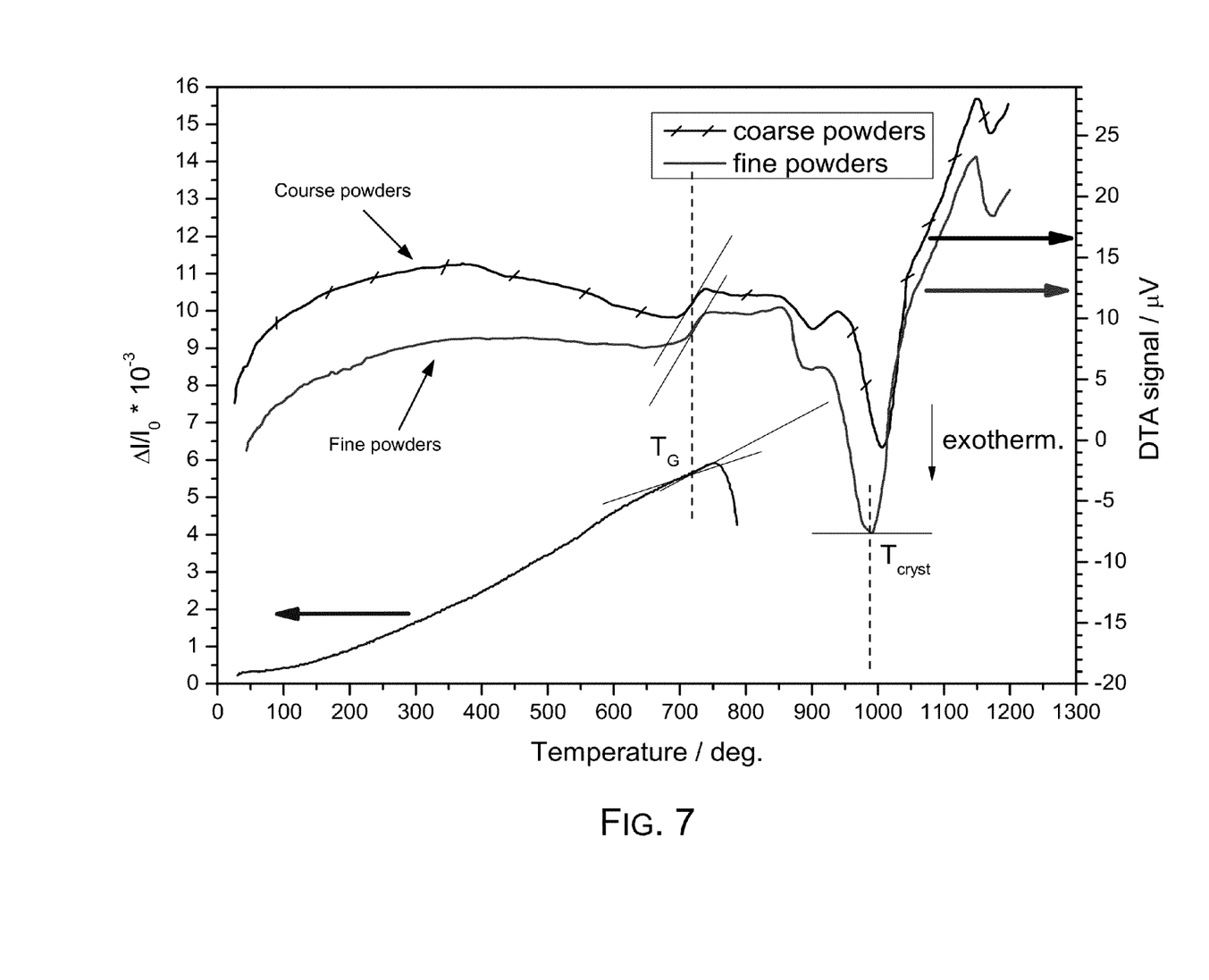
FIG. 7 illustrates Differential Thermal Analysis (DTA) and dilatometric plots for samples of glass frits of glass ceramic glazes.

FIG. 7 illustrates Differential Thermal Analysis (DTA) and dilatometric plots for samples of glass frits of glass ceramic glazes. The DTA of a frit of a glass ceramic glaze composition at degree 1 shows that glass in the sample is prone to surface crystallization. A crystallization exothermic peak is more intense for fine powders than for coarse ones. A crystallization temperature is also lowered for fine powders to about 1000° C. Both plots of DTA and dilatometric prove that a glass transition temperature is 700° C. A remarkable densification is generally optimized within 50° C. to 100° C. above the dilatometric softening point. Thus, 1000° C. is considered as an appropriate reference temperature.

Various embodiments of the invention produce glass ceramic glaze compositions with significantly improved properties. The mechanical characterization of a glass ceramic glaze composition of the invention has Young's modulus in a range of about 40 Gigapascals (GPa) to about 80 GPa, bending strength of about 20 MPa to about 150 MPa and density of about 1.65 grams per cubic centimeter (g/cm$^3$) to about 2.40 g/cm$^3$. Various embodiments of the invention also produce a glazed foam sandwich panels with significantly improved properties. The mechanical characterization of the glazed foam sandwich panels of the invention has final density of about 1.0 g/cm$^3$ to about 1.8 g/cm$^3$, water absorption of about 0.1% to about 0.5% and flexural strength of about 10 MPa to about 20 MPa. The flexural strength is measured with the 4-point flexural test.

Various embodiments of the invention provides an environment friendly glazed glass ceramics as the various industrial waste materials and waste glasses are used to manufacture the glazed glass ceramics. The glazed foam sandwich panels can be classified as sustainable green materials as per international green building criteria and standards. Further, the glazed foam sandwich panels of the invention used in building industries can be recycled and reused when a building is demolished.

The glazed glass ceramics of the invention not only wipes out issues of open porosity and water absorption of glass ceramics but also allows tuning colors of the glazed glass ceramics. Further, due to use of a low amount of glaze per unit product, usage of valuable raw materials is sustainable.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method for recycling an industrial waste to prepare recyclable foam sandwich panels and recyclable foam sandwich glazed glass ceramic tiles for building construction, the method comprising:

pressing a first fine powder of a set of raw materials for preparing a core layer, wherein the set of raw materials comprises at least two raw materials selected from the group consisting of white sand, clay, cullet, limestone, pozzolanic waste and fly ash;

depositing a second fine powder of a glass ceramic glaze composition on at least one surface of the core layer, the glass ceramic glaze composition comprising at least one glass frit, wherein a glass frit of the at least one glass frit comprises about 0 wt % to about 20 wt % of alumina ($Al_2O_3$),
about 5 wt % to about 15 wt % of calcium oxide (CaO),
about 0 wt % to about 10 wt % of ferric oxide ($Fe_2O_3$),
about 0 wt % to about 15 wt % of potassium oxide ($K_2O$),
about 0 wt % to about 15 wt % of magnesium oxide (MgO),
about 3 wt % to about 15 wt % of sodium oxide ($Na_2O$),
about 0 wt % to about 2 wt % of phosphorus pentoxide ($P_2O_5$),
about 45 wt % to about 75 wt % of silicon dioxide ($SiO_2$),
about 0 wt % to about 4 wt % of titanium dioxide ($TiO_2$) and
about 0 wt % to about 1 wt % of Chromium(III) Oxide ($Cr_2O_3$);

pressing the at least one surface of the core layer and the second fine powder in response to depositing the second find powder; and firing the core layer and the second fine powder at a temperature of about 950° C. to about 1150° C., wherein the set of raw materials comprises about 10 wt % to about 40 wt % of white sand, about 10 wt % to about 40 wt % of clay, about 10 wt % to about 30 wt % of cullet, about 5 wt % to about 20 wt % of limestone, and about 10 wt % to about 30 wt % of fly ash.

2. A method of claim 1, wherein the temperature of firing the core layer and the second fine powder is decreased with a rate of about 120° C. per minute to about 40° C. per minute until the temperature reaches 800° C., wherein the temperature is gradually decreased to room temperature for retaining porosity of the glass ceramic substrate formed in the glazed glass ceramic.

3. The method of claim 1, wherein the at least one surface of the core layer and the second fine powder are pressed using one of uniaxially cold pressing, biaxial cold pressing, dry pressing, semi-dry pressing, compacting, cold isostatic pressing, hot pressing, extrusion molding, injection molding, compression molding, gel casting, slip casting and tape casting.

4. The method of claim 1, wherein the core layer and the second fine powder are fired at a temperature of about 950° C. to about 1150° C. with a rate of about 40° C. per minute to about 120° C. per minute for a period of about 12 minutes to about 1 hour 30 minutes.

5. The method of claim 1, wherein the first fine powder and the second fine powder are of particle sizes less than 90 microns.

\* \* \* \* \*